United States Patent [19]

Ehlers

[11] Patent Number: 4,626,848
[45] Date of Patent: Dec. 2, 1986

[54] PROGRAMMABLE FUNCTIONS FOR RECONFIGURABLE REMOTE CONTROL

[75] Inventor: Raymond G. Ehlers, Chesapeake, Va.

[73] Assignee: General Electric Company, Portsmouth, Va.

[21] Appl. No.: 610,549

[22] Filed: May 15, 1984

[51] Int. Cl.$^4$ .......................... G08C 19/00; H04B 9/00
[52] U.S. Cl. .......................... 340/825.69; 340/825.57; 340/825.72; 455/603; 455/608; 358/194.1
[58] Field of Search .......................... 340/825.57, 825.69, 340/825.72, 825.34, 825.31; 358/194.1; 375/69; 455/601, 603, 608

[56] References Cited

U.S. PATENT DOCUMENTS 4,535,333  8/1985  Twardowski .................. 340/825.69

*Primary Examiner*—Ulysses Weldon
*Assistant Examiner*—Ralph Smith

[57] ABSTRACT

A reconfigurable remote control transmitter is disclosed that has the ability to learn, store and repeat the remote control codes from any other infrared transmitter. The reconfigurable remote control transmitter includes an infrared receiver, a microprocessor, nonvolatile and scratch pad random access memories, and an infrared transmitter. The microprocessor application is divided into four main categories: learning, storing, retransmitting, and user interface. In the learning process, the reconfigurable remote control transmitter receives and decodes the transmissions from another remote control transmitter. The process is repeated at least twice for each key to make sure that it has been properly received and decoded. Once the data has been received and decoded, it is stored for later use. In order to do this, the received and decoded data is compressed so that it can fit into the nonvolatile memory. This process is repeated for each of the several remote control transmitters that are to be replaced by the reconfigurable remote control transmitter. When the learning and storing operations have been completed, the reconfigurable remote control transmitter is ready to use.

6 Claims, 23 Drawing Figures

MODULATION SCHEMES

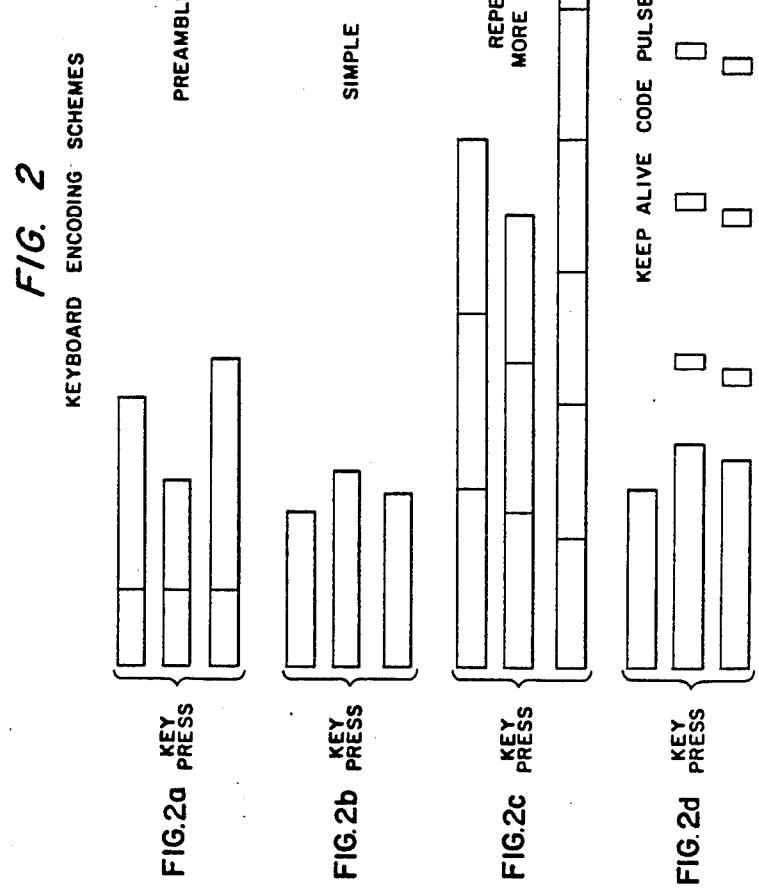

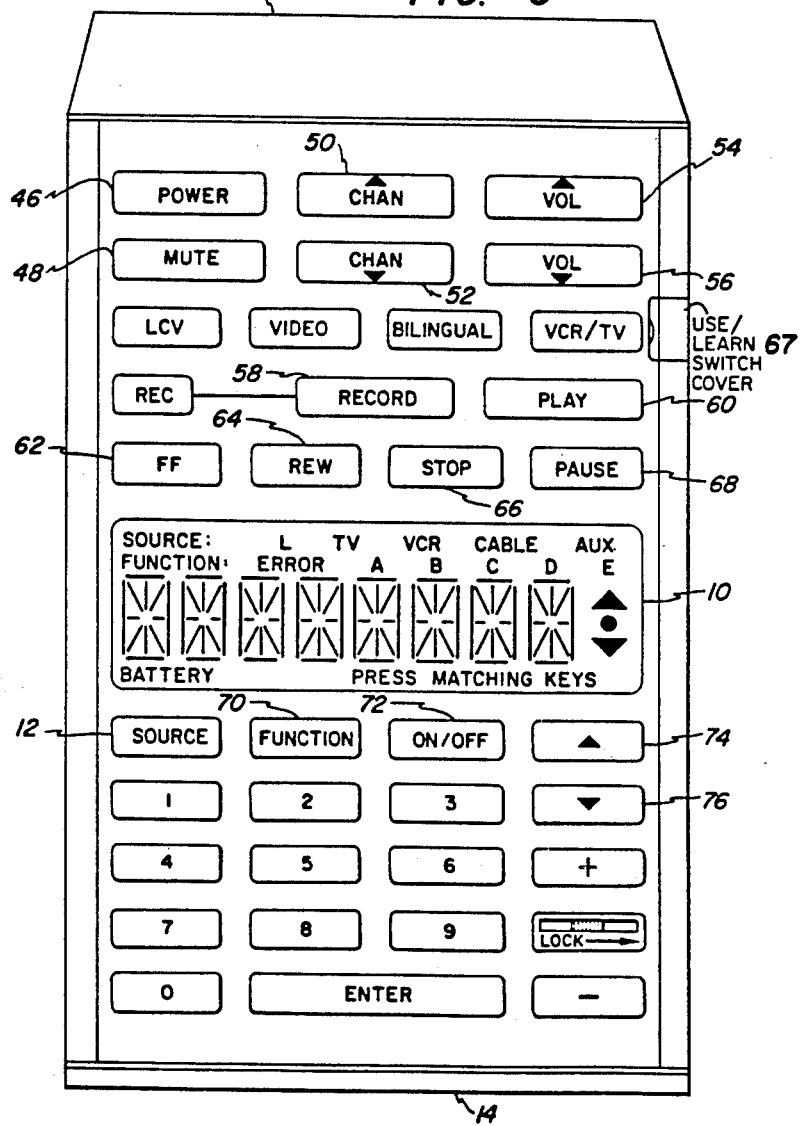

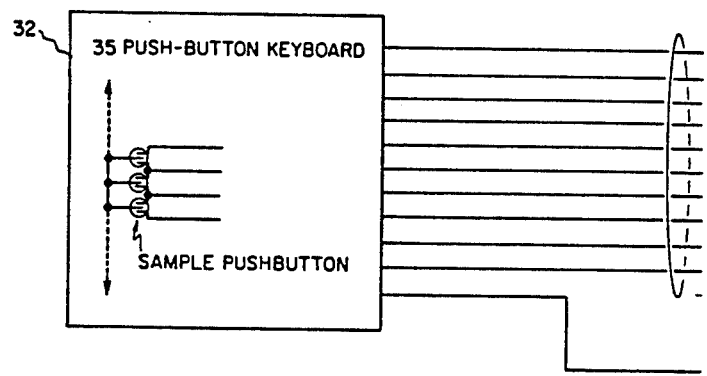
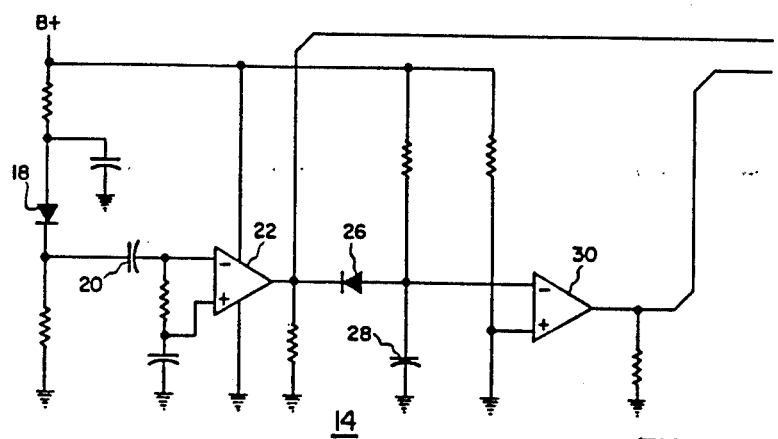
FIG. 4a

FIG. 5a

| BIT | 0 | 1 | 0 | 1 | 1 | 0 | |
|---|---|---|---|---|---|---|---|
| PULSES | 16 | 36 | 15 | 38 | 37 | 17 | |
| TIME | .40 | .92 | .39 | .95 | .93 | 42 | |
| TIME | | 1.42 | .94 | 1.36 | .90 | .96 | 200+ |
| BIN | A | B | C | D | A | B | C | D | C | D | A | END |

FIG. 5b

| BIN | A | B | C | D |
|---|---|---|---|---|
| LOWER | 14 | 1.24 | 32 | .82 |
| MIDDLE | 16 | 1.42 | 36 | .94 |
| UPPER | 18 | 1.60 | 40 | 1.06 |
| TYPE | BURST | PAUSE | BURST | PAUSE |

FIG. 6

| | KEY SEQUENCE | | | | | | | | | | |
|---|---|---|---|---|---|---|---|---|---|---|---|
| 1 | 1st | A | B | C | D | A | B | C | D | A | |
| | 2nd | A | B | C | D | A | B | C | D | A | |
| | | | | | | | | | | | |
| | 1st | A | B | A | B | C | D | A | B | C | D | C |
| 2 | 2nd | A | B | A | B | C | D | E | ≡MOVED≡ | | | |
| | 3rd | A | B | A | B | C | D | A | B | C | D | C |
| | | | | | | | | | | | | |
| | 1st | A | B | C | D | C | D | A | B | F | ≡MOVED≡ | |
| 3 | 2nd | A | B | C | D | C | D | A | B | A | B | C |
| | 3rd | A | B | C | D | C | D | A | B | A | B | C |
| | 4th | A | B | C | D | C | D | A | B | A | B | C |
| | | | | | | | | | | | | |
| 4 | 1st | A | B | C | D | A | B | A | B | C | | |
| | 2nd | A | B | C | D | A | B | A | B | C | | |

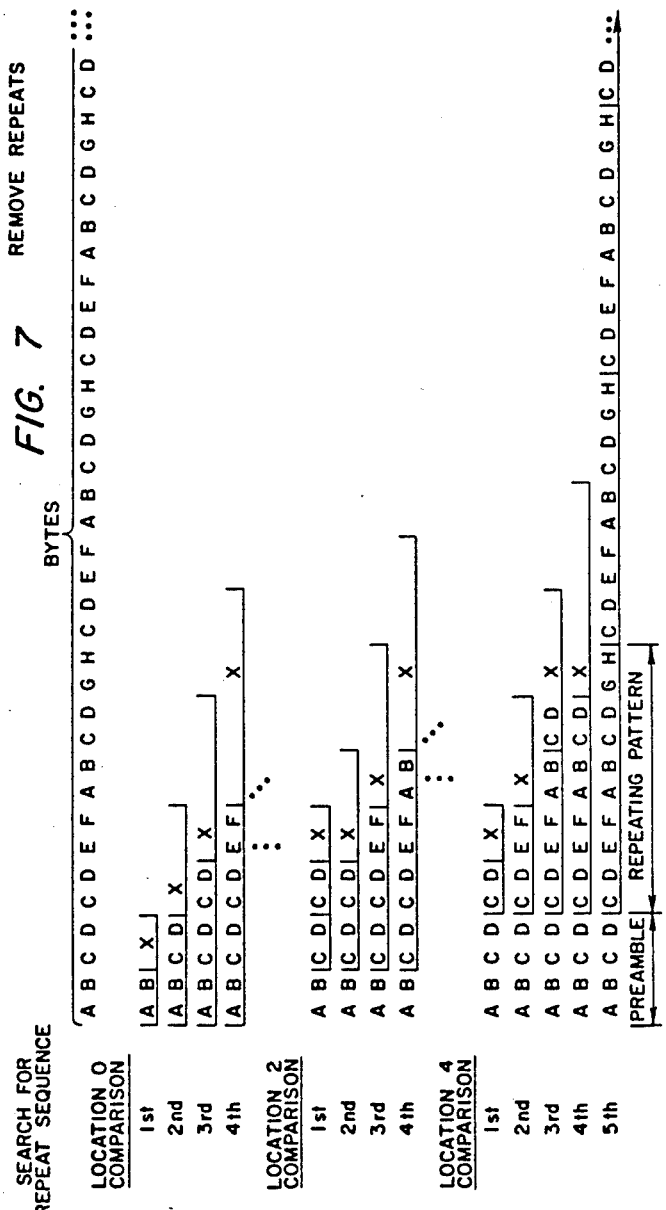

4,626,848

PROGRAMMABLE FUNCTIONS FOR RECONFIGURABLE REMOTE CONTROL

CROSS REFERENCE TO RELATED APPLICATION

The subject matter of this application is related to the subject matter of an application entitled "Reconfigurable Remote Control" filed by Kenneth B. Welles II, Ser. No. 610,377 filed concurrently herewith and assigned to a common assignee with this application. The subject matter of that application is incorporated herein by reference.

FIELD OF THE INVENTION

The present invention generally relates to remote control transmitters of the type used with various consumer products such as television receivers and the like and, more particularly, to a reconfigurable remote control transmitter which may be programmed to emulate any one of a plurality of individual transmitters.

BACKGROUND OF THE INVENTION

Many new consumer electronic products, particularly video products, are available with hand held infrared remote control transmitters. A consumer may have separate remote control transmitters for a television, a cable converter, video cassette recorder, and a video disc player, for example. In such a case, it is confusing to know which transmitter to pick up to control which product. Moreover, carrying around four different remote control transmitters spoils the convenience of the remote control feature. It is therefore desirable to provide a single remote control transmitter for controlling each of the several products.

A number of solutions have been proposed for this problem in the prior art. One example is disclosed in the patent to Litz et al, U.S. Pat. No. 4,274,082. In the Litz et al system, an amplifier, a tuner, a tape recorder, and a turntable are interconnected by a two-conductor cable. Each of these devices is controlled by a corresponding microprocessor, and a hand held transmitter is used to transmit coded signals that control the operation of the individual devices. The coded signals are received by a common receiver and first conversion circuit to provide voltage pulses on the two-wire cable. Additional conversion circuits are required for each microprocessor in order to convert the voltage pulses on the two-wire cable to pulses which can be used by the microprocessors.

Another example is disclosed in U.S. Pat. No. 4,200,862 to Campbell et al. The Campbell et al system includes a single receiver/transmitter unit which may be placed on a table, for example, and a hand held transmitter, but in this case, the receiver/transmitter unit injects digital pulses onto the house mains at times of zero crossing of the mains voltage. Various appliances are plugged into the house mains via slave units which are each responsive to an assigned digital address and a digital operation code to control its appliance.

Common to both the Litz et al and Campbell et al systems is the use of a central receiver, an interconnecting transmission line and the requirement of a separate controller device for each product or appliance. Clearly, this approach solves the basic problem of multiple transmitters for multiple products or appliances, but the solution is both complex and expensive from the point of view of the consumer. A simpler, less expensive solution to the problem is needed.

SUMMARY OF THE INVENTION

It is therefore an object of the present invention to provide a single remote control transmitter which can operate any product or appliance with a remote control feature without modification or interconnection of the individual products or appliances.

It is another object of the invention to provide a simple and inexpensive control for a plurality of remotely controlled consumer products even though those products may be produced by different manufactures and respond to different transmission protocols.

The objects of the invention are accomplished by providing a reconfigurable remote control transmitter that has the ability to learn, store and repeat the remote control codes from any other infrared transmitter. The reconfigurable remote control transmitter includes an infrared receiver, a microprocessor, nonvolatile and scratch pad random access memories, and an infrared transmitter. The microprocessor application is divided into four main categories: learning, storing, retransmitting, and user interface. In the learning process, the reconfigurable remote control transmitter receives and decodes the transmissions from another remote control transmitter for, say, a television receiver. The process is repeated at least twice for each key to make sure that it has been properly received and decoded. Once the data has been received and decoded, it must be stored for later use; however, in order to do this, the received and decoded data must be compressed so that it can fit into the nonvolatile memory. This process is repeated for each of the several remote control transmitters that are to be replaced by the reconfigurable remote control transmitter. When the learning and storing operations have been completed, the reconfigurable remote control transmitter is ready to use.

BRIEF DESCRIPTION OF THE DRAWINGS

The foregoing and other objects, advantages and aspects of the invention will be better understood from the following detailed description of the invention with reference to the drawings, in which:

FIGS. 2a to 2d are graphical representations of several keyboard encoding schemes that may be used with the modulation schemes illustrated in FIGS. 1a to 1i;

FIG. 3 is a plan view of the reconfigurable remote control transmitter according to a preferred embodiment of the present invention;

FIGS. 4a–4d, when aligned from left to right, constitute a block diagram of the reconfigurable remote control transmitter according to a preferred embodiment of the invention;

FIGS. 5a and 5b are graphical and tabular representations of the data collection and initial data compression technique performed by the preferred embodiment shown in FIG. 4;

FIG. 6 is a tabular representation of the correlation process performed during the learning procedure;

FIG. 7 is a tabular representation of the process of removing repeats from the learned code in order to further compress the data for storing in the nonvolatile memory; and FIG. 8 is a tabular representation of the compressed learned code.

DETAILED DESCRIPTION OF THE PREFERRED EMBODIMENT

Figure 1:
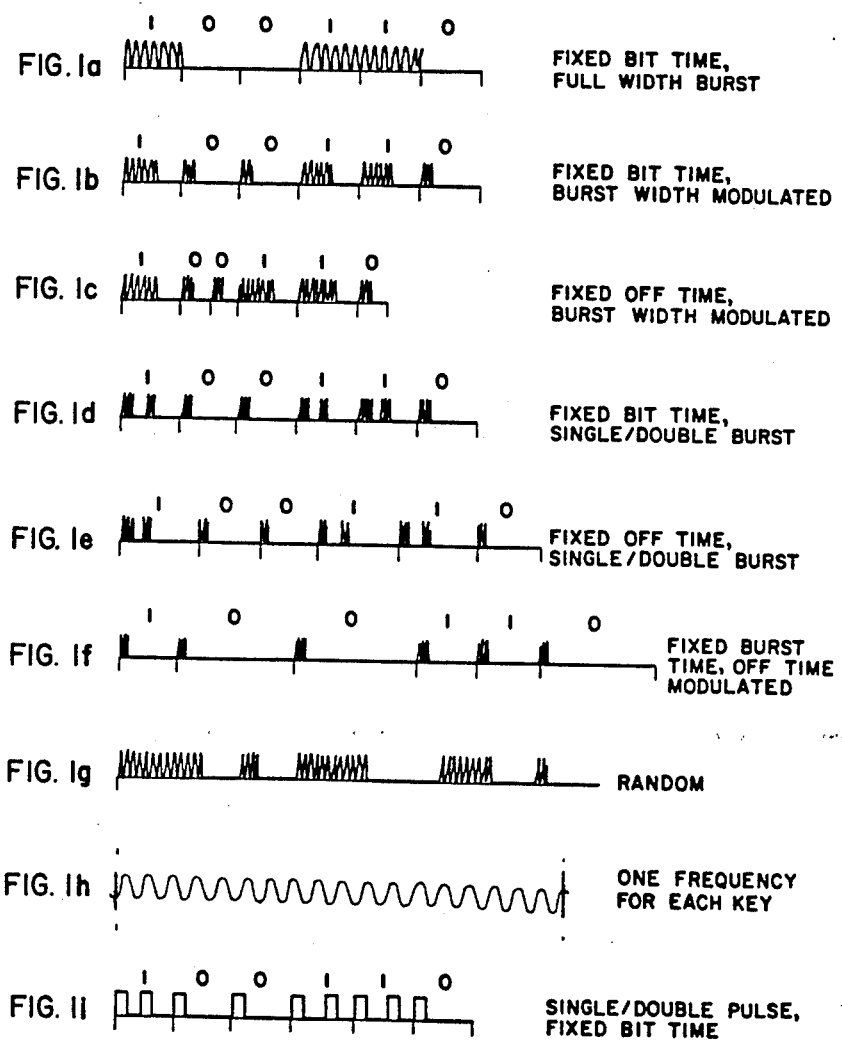
FIGS. 1a to 1i are graphical representations of several modulation schemes which are used in infrared remote control transmitters.

In order to understand the learning process, the available infrared codes to be learned must first be understood. This turns out to be a very wide range of different codes. FIG. 1 illustrates several modulation schemes. FIGS. 1a through 1g are different types of gated carrier frequency. Typical carrier frequencies for infrared remote transmitters are 20 KHz to 45 KHz, with the majority at 38 KHz and 40 KHz. The gating schemes illustrated include both fixed and variable bit periods, non-return to zero (NRZ), variable burst width, single/double burst modulation schemes, and a final catch-all category called random because there is no readily distinguishable pattern of ones and zeros. In addition to these schemes, there is also a transmitter which puts out a different continuous frequency (CW) for each key at approximately 300 Hz spacings as represented in FIG. 1h. Finally, several new types of transmitters do not use a carrier frequency at all but, instead, send a stream of pulses where the data is encoded in the spacing between infrared pulses as shown in FIG. 1i.

FIG. 1 shows the data modulation schemes, but most transmitters also have a higher level of data organization, which may be called a keyboard encoding scheme. This causes data to be sent in different formats depending on the transmitter and the key pressed. FIG. 2 shows several of these keyboard encoding schemes. FIG. 2b shows data that is sent once for each key press. FIG. 2c shows data that is repeated three times and then stopped for each key press. These schemes are used to conserve power and extend battery life. FIG. 2c also shows data that continues to repeat as long as the key is pressed. This is often used for continuous functions such as volume control or channel scanning. FIG. 2d shows a modification of the continuous repeat scheme shown in FIG. 2c where the initial key data is sent, followed by a series of "keep-alive" pulses as long as the key is pressed. This scheme is also used to conserve power and extend battery life. In addition to schemes 2b through 2d, some remote control transmitters precede all transmitted key data with some form of preamble data stream to get the receiver's attention. This is shown in FIG. 2a, but it will be understood that such preamble data stream can be used with each of the keyboard encoding schemes shown in FIG. 2.

Reference is now made to FIG. 3 which shows in plan view the reconfigurable remote control transmitter according to a preferred embodiment of the invention. The first thing to be observed is that this unit is not much more complicated than a single transmitter for a single product. This is accomplished by the use of a combination of hard keys and soft keys and an liquid crystal display (LCD) about which more will be said later. Suffice it to say for now that hard keys are those which have a predefined function and soft keys are those which have a programmable function. The reconfigurable remote control transmitter shown in FIG. 3 is capable of emulating up to four different transmitters which are indicated in the liquid crystal display 10 adjacent the legend "SOURCE" as TV, VCR, CABLE, and AUX, the latter being for "auxiliary" which may be any fourth device such as, for example, a video disc player. The user selects the desired source by pressing the source key 12 each time a change in the source is desired, which causes the individual legends TV, VCR, CABLE, and AUX to be successively displayed in accordance with the succession of source key depressions. When the legend for the desired source is displayed, the user simply stops depressing the source key and proceeds to operate the selected source. There is also provided a learning switch (not shown) which may be provided in a protected location on the side or bottom of the transmitter case since this switch is used only once (typically) for each transmitter which is to be emulated. This switch might be located, for example, behind a slidable or pivotal cover 67 in order to prevent younger members of the family from operating it. In the learning mode, the switch is moved to the learning position and the transmitter which is to be emulated is placed so that its transmitter infrared light emitting diode (LED) is adjacent the photoelectric receiver in the reconfigurable remote control unit. The photoelectric receiver 14 might, for example, be located at the end opposite to the infrared LED transmitter 16 in the reconfigurable remote control transmitter as shown in FIG. 3. The source is selected by pressing the source key 12 as described above, and when the legend for the desired source is displayed, the user presses the enter key 78. The user is then prompted in the liquid crystal display 10 to press a key on the reconfigurable remote control transmitter and a corresponding key on the transmitter to be emulated so that the transmitted code can be received and encoded. As will be explained in further detail, this prompt is repeated at least twice for each key in order to insure that the transmitted signal has been properly received and encoded.

Figure 4B:
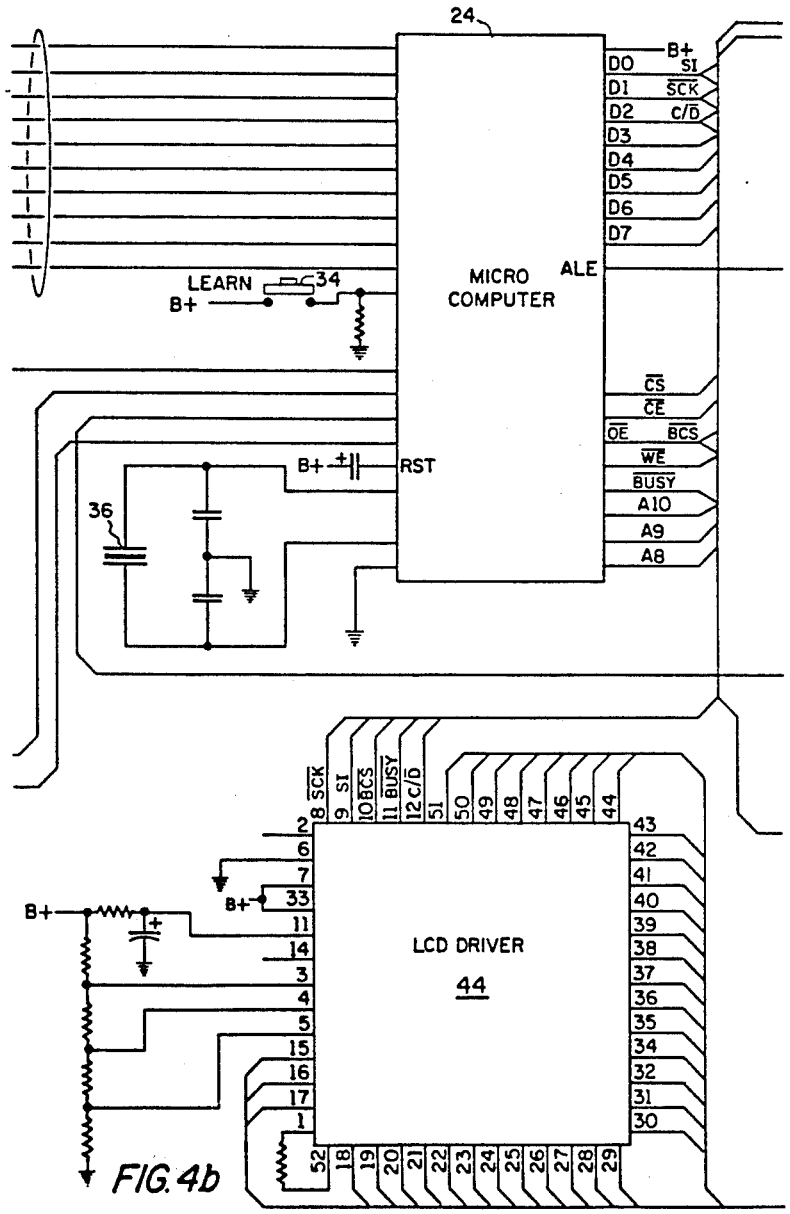
Figure 4C:
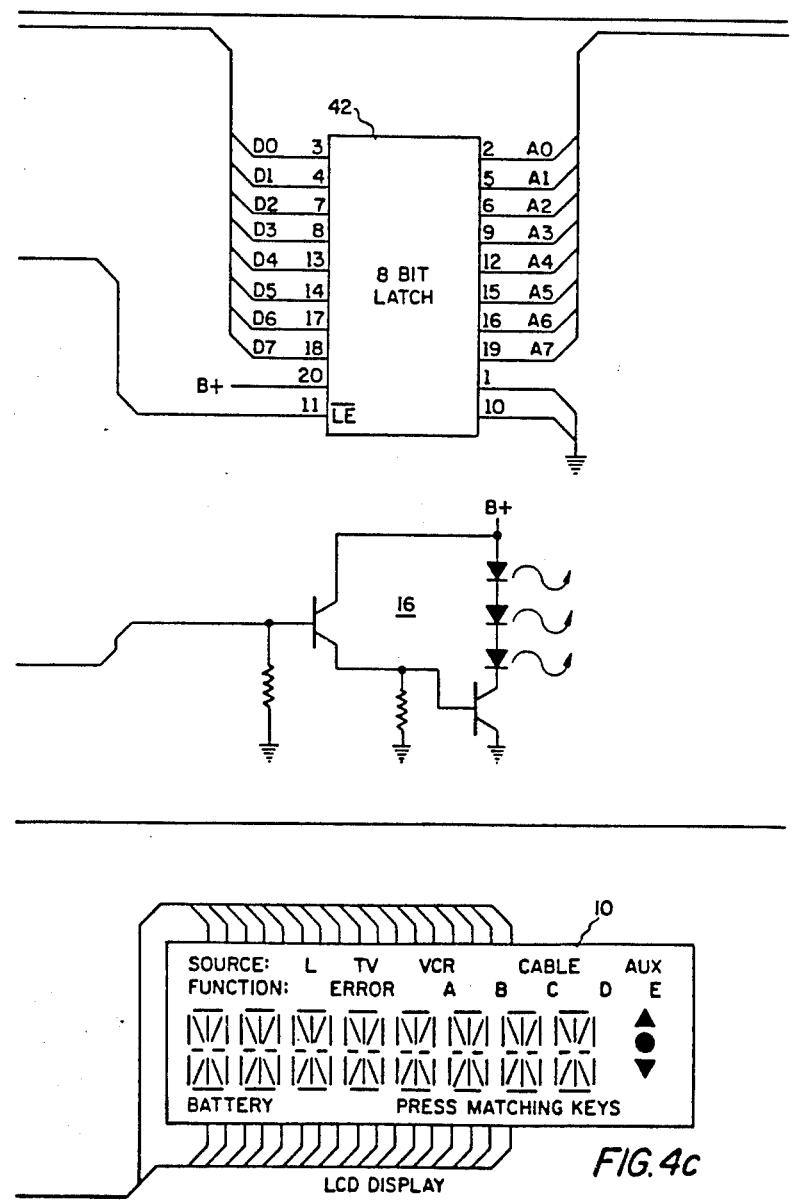
Figure 4D:
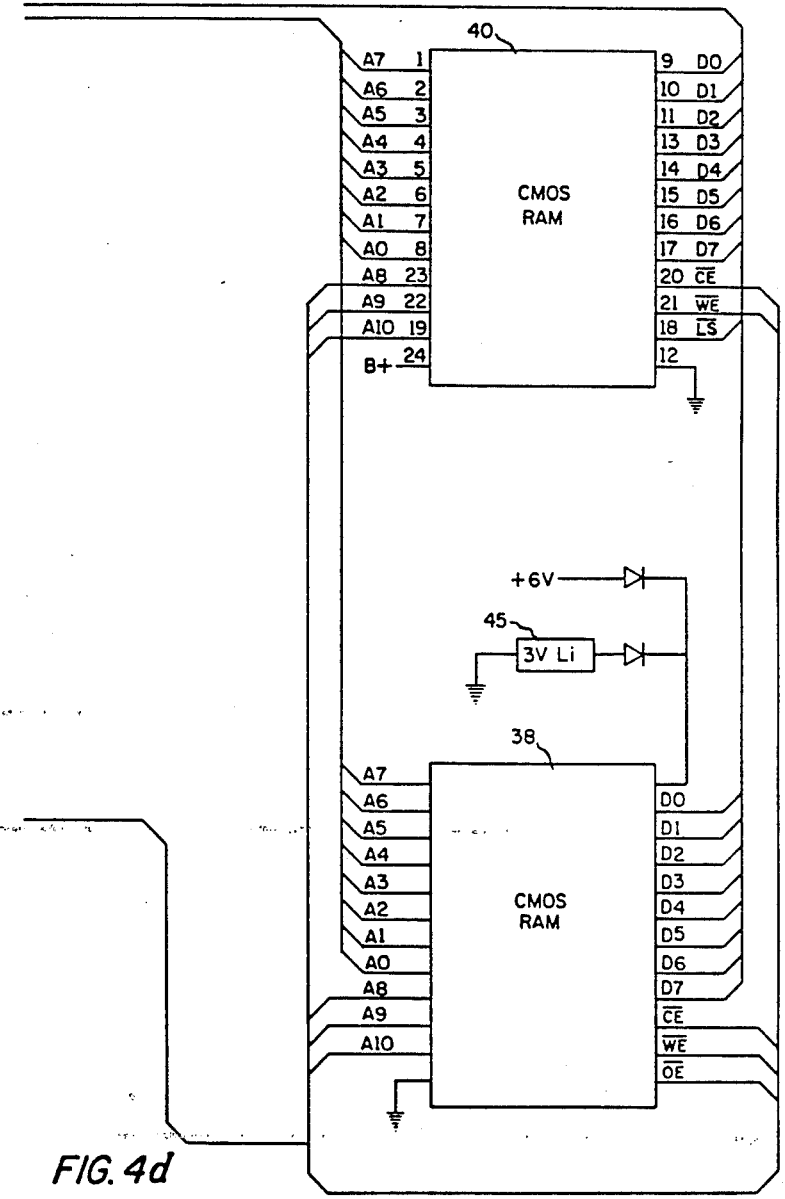

Turning now to FIG. 4, the receiver 14 for the reconfigurable remote control transmitter includes a photodiode 18 connected by a differentiating capacitor 20 to the variable input of threshold amplifier 22. The output of this amplifier 22 is a series of pulses having a frequency equal to the frequency of the transmitted signal. The output of amplifier 22 is connected to an input of the microprocessor 24 and also to a detector diode 26. The output of the detector diode 26 is integrated by capacitor 28 and supplied to the variable input of a second threshold amplifier 30. The output of this amplifier is the detected envelope of the transmitted signal and is supplied to another input of the microprocessor 24. Also supplied as inputs to the microprocessor 24 are the outputs of the push button keyboard 32 and the learn switch 34. The microprocessor 24 has its own internal clock which is controlled by a crystal 36. The microprocessor 24 provides addresses for the nonvolatile random access memory 38 and the scratch pad memory 40 to the address register 42 which comprises an 8-bit latch. The two memories are essentially the same except that the nonvolatile random access memory 38 is provided with a low voltage power supply 45, typically a lithium battery, in addition to being supplied from the main power supply in order to maintain the data stored in the memory even when the main battery supply is off or dead. The microprocessor 24 also provides the control signals to the LCD driver 46 which in turn controls the liquid crystal display 10. In addition, the microprocessor provides the drive signals for the infrared transmitter 16. In order to minimize battery drain, the several integrated circuits shown in FIG. 4 are made with CMOS (complementary metal oxide semiconductor) technology. For example, the microprocessor may be an Intel 87C51 or a Mitsubishi 50741 microprocessor, and the memories may be Intel 2816 or Hitachi HM6116 random access memories.

The reconfigurable remote control, in the learning process, must be able to receive, learn and repeat all of the schemes described with reference to FIGS. 1 and 2. In addition, in the learning process the reconfigurable remote control must read each code at least twice to make sure that it has been properly received and decoded. Small variations in the incoming code must be tolerated while large variations (errors) must be recognized and rejected. The process is illustrated with reference to FIGS. 5 and 6. Referring to FIG. 5a first, the modulation scheme represented by FIG. 1b is taken as exemplary. This modulation scheme uses a fixed bit time but the burst width is modulated. In other words, the time for a binary "1" is the same as the time for a binary "0" but, in the case illustrated, the number of pulses transmitted for a "1" is more than for a "0". The time period for a binary bit is nominally 1.85 milliseconds, the number of pulses for a binary "1" is nominally 37, and the number of pulses for a binary "0" is nominally 16. When the learn switch 34 is switched to the "learn" position, the liquid crystal display 10 flashes the letter "L" to constantly remind the user that the reconfigurable remote control transmitter is in the learn mode. The user is then prompted to press a key on the reconfigurable remote control transmitter and a corresponding key on the transmitter to be emulated in order to transmit a signal to be received and encoded. The first step in the receiving and encoding process is to count the number of pulses in each burst and the time period of each pause between pulses. This pulse count and pause duration data completely defines the incoming signal. From this data the frequency of the transmitted signal is computed by dividing the largest number of pulses in a single burst by its corresponding time duration. For example, in FIG. 5a the largest number of pulses is 38 and its time period is 0.95 milliseconds. The reason for using the largest number of pulses and its time period is to obtain the most accurate determination of the frequency of the transmitted signal. This initial raw data consists of 100 states, each state being defined as two 16-bit numbers (between 1 and 65535). The first 16-bit number represents the number of infrared pulses in the pulse train. The second 16-bit number represents the time interval that the infrared pulse train was off. An additional 16-bit number represents the frequency of the infrared pulse train (typically from 30 KHz to 100 KHz). This data requires about 3200 bits of data per key pressed.

The first compression of this data is made by categorizing the pulse bursts and pauses into "bins", each bin being two bytes with the most significant bit indicating whether the bin is a burst or a pause. As shown in FIG. 5a, four bins are established for the illustrated example. These are labled A, B, C, and D with A and C being designated as bins for bursts and B and D being designated as bins for pauses. It will of course be understood that more or fewer bins may be required depending on the modulation scheme which is being learned. In order to categorize the pulse bursts and pauses into the several bins, a tolerance is established so that all the bursts and pauses within a nominal range are appropriately categorized into one or another of the bins. This is indicated in FIG. 5b which shows lower, middle and upper values of the number of pulses in a burst and the duration of a pause. Those bursts or pauses not falling into one of these bins would be assigned to another bin established for that burst or pause. By creating these bins, the initial raw data or about 3200 bits is stored to 1600 bits per key and 16 bits per bin in the scratch pad memory 40 of FIG. 4. The user is then prompted in the liquid crystal display 10 to press the encoded key a second time and the process is repeated. Then correlation is performed on the encoded data for that key as illustrated by FIG. 6. Suppose that for key one, the two encoded data are the same as shown at the top of the figure. In this case, the key code sequence has been properly learned and can be further compressed for storage in the nonvolatile memory 38. On the other hand, assume that in the process of pressing key two for the second time, the user inadvertently moves the transmitter to be emulated and the reconfigurable remote control transmitter with respect to one other so that the encoding for the second key press is an error. In this case, the user will be prompted on the liquid crystal display 10 to press the key a third time. If the third encoding matches the first as illustrated in the figure, then the key code sequence is considered to be properly learned and can be further compressed for storage in the nonvolatile memory. A third possibility is illustrated in FIG. 6 and this is the case where the initial encoding is in error. Under these circumstances, no successive encoding would ever match the first. What the correlation algorithm does in this case is if the third encoding does not match the first, then the fourth is compared with the third and so on until a match of alternate encodings is obtained.

When each key has been properly learned, the initially encoded data or each key must be further compressed to such an extent that the data for all four remote transmitters will fit into a 2K byte memory. This data compression must maintain all of the vital information so that the infrared signal can be accurately reconstructed during transmission. The first step is illustrated in FIG. 7 and involves the removal of repeats from the key encoding. It will be recalled that some of the keyboard encoding schemes shown in FIGS. 2c and 2d involved repeated transmission patterns. As illustrated in FIG. 7, the first two bytes (each representing a different bin) are compared with the second two bytes, and if there is no match, then the first four bytes are compared with the next four bytes. Again, if there is no match, the first six bytes are compared with the next six bytes and so on increasing in two byte intervals until a total of half of the stored bytes are being compared with the other half of the stored bytes. If no match is obtained, then the process is repeated from the start but omitting the first two bytes and then the first four bytes. In the case illustrated in the figure, a repeating pattern of ten bytes is found after an initial four byte preamble. The number and pattern of the repeats are then encoded in a reduced format, as shown in FIG. 8. This reduces data to between 6 and 60 states per key, 96 to 960 bits of data per key. Once this has been accomplished, the encoding for all keys is examined in order to determine if there is a common preamble. If there is, this preamble is separately encoded and stripped from the encoding of all keys. This reduces data to (typically) 96 to 480 bits per key. Then the number of bins is represented by a smaller number of bits than the eight bits comprising each byte. For the case illustrated in FIG. 5, for example, the number of bits required to represent the four bins is only two. Typically, the 8-bit pin pointer or number is reduced to a 5-bit or less bin pointer depending on the number of bins required to encode the original data. This typically reduces data to 48 to 240 bits per key. In this way, data is reduced to a manageable storage size, and all of the compression data is also retained to allow re-expansion of the data to its uncompressed format for retransmission during emulation. More specifically, the compressed data comprises the bin code, the position of the start of any repeating patterns, the length of the repeating pattern, the number of repeats, and the frequency of the transmission. If there is a preamble, this is stored separately to be generated for each key pressed. This compressed data is then stored in the nonvolatile memory 38 of FIG. 4.

This completes the learning and storing processes which are common to all the keys on the transmitter to be emulated. Certain keys are common to most remote transmitters, and these keys are included on the reconfigurable remote control transmitter as shown in FIG. 3. For example, the upper part of the transmitter includes a power key 46, a mute key 48, a channel up key 50, a channel down key 52, a volume up key 54, and a volume down key 56. In addition, specific keys may be provided for a video cassette recorder such as a record key 58, a play key 60, a fast forward key 62, a rewind key 64, a stop key 66, and a pause or stop motion key 68. At the lower part of the transmitter there is the usual numerical keypad and enter key. Other keys shown may be assigned other predetermined functions. However, because the remote transmitters from different manufacturers vary widely, providing all the keys from even four different remote control transmitters on one unit would unduly complicate the reconfigurable remote control transmitter of the present invention and make operation confusing to the user. To avoid this, programmable or "soft" keys are provided which are controlled by means of the function key 70. These keys include an on/off key 72, an up key 74 and a down key 76. The function performed by these keys depends on the function selected by the function key 70. More particularly, when the function key is pressed, a sequence of functions is displayed by the liquid crystal display depending upon the source that has been selected. The desired function is selected by sequencing the function key until that function is displayed. Examples of specific functions which may be performed by the several sources are listed in the following tables.

| LCD - TV FUNCTIONS | LCD - VCR FUNCTIONS |
|---|---|
| Clear Scr. | Slow ▲ |
| Sound Cont. | Slow ▼ |
| VIR | Search ▲ |
| Chan Block | Search ▼ |
| Off Timer | Reverse Play |
| Sound + | Fast Play |
| Cable | Frame Advan. |
| Audio Mode | A • ⬥ |
| Video Mode | B • ⬥ |
| Pict. Cont. ▲ | C • ⬥ |
| Pict. Cont. ▼ | LCD - CABLE FUNCTIONS |
| Brightness ▲ | Tuning ▲ |
| Brightness ▼ | Tuning ▼ |
| Color | A • ⬥ |
| Tint ▲ | B • ⬥ |
| Tint ▼ | C • ⬥ |
| Treble ▲ | LCD - AUX FUNCTIONS |
| Treble ▼ | TBD |
| Bass ▲ | A • ⬥ |
| Bass ▼ | B • ⬥ |
| Balance ▲ | C • ⬥ |
| Balance ▼ | |
| Sharpness ▲ | |
| Sharpness ▼ | |
| Homenet | |
| A • ⬥ | |
| B • ⬥ | |
| C • ⬥ | |

In FIG. 3, the function "Sharpness" has been selected for the source TV and the up and down arrows indicate that the up and down keys are to be used to control this function. It will be observed that each of the function tables include the functions "A", "B" and "C". These are for user defined functions for those situations that a transmitter to be emulated includes a function that is not previously stored in the reconfigurable remote control transmitter. In such a case, the user selects one of these functions and provides it with a label. This label is generated by either the + key or the − key to cycle through the alphabet. Once the correct letter is displayed, the user presses the enter key 72 to enter it and the display indexes over one character position where the process is repeated and so on until the complete label is generated. Thus, the liquid crystal display 10 and the keys of the reconfigurable remote control transmitter of the invention have been designed to provide a user freindly interface which is simple and easy to use no matter what combination of remote transmitters it is configured to emulate.

After the transmitter has been configured as desired by the user, it is ready to use. This requires that the transmitter recall, expand and transmit the required code. This is accomplished by first determining which source has been chosen so that the correct block of data in the nonvolatile memory 38 is addressed. Then when a key is pressed, the entire block of data for that source is transferred to the scratch pad memory 40. If a preamble code exists, it is copied into a 200 byte array in memory 40. Next, the key code is copied into the 200 byte array after the preamble code. At the same time, the bit compressed codes for the preamble and the key code are expanded into byte codes. Then the start, length and repeat number values are added to the code for this key. All that remains is to generate the required carrier frequency. This is accomplished by software rather than provide individual carrier generators. In other words, the microprocessor uses its own clock and a divider process in order to generate the required frequency. Transmission of the expanded code is done by setting a pointer at the start of the 200 byte array and taking the 16-bit pulse count from the category indicated by the byte at the pointer. These pulses are transmitted at the carrier frequency for the pressed key. The 16-bit pause count from the category indicated by the byte at pointer +1 is then taken to determine the required length of time for the pause, and then the next pointer is taken and so on until the entire expanded code is transmitted.

Thus, there has been provided a reconfigurable remote control transmitter capable of emulating several remote control transmitters which is simple to use and requires no interconnection or modification of the products controlled. While a specific preferred embodiment has been described, those skilled in the art will recognize that the invention can be modified within the scope of the appended claims to provide for the control of more or less than four products or appliances which may or may not include video products. In addition, the specific data encoding and compression techniques may be modified to accomodate the data to the storage space available in the nonvolatile memory.

The program specification for the programming sequence of the reconfigurable remote control transmitter is set forth below. Following that is a listing for a finite statement machine which specifies the program of the microprocessor.

PROGRAMMING SEQUENCE

| PROGRAM INSTRUCTIONS | LCD DISPLAY INSTRUCTIONS | | COMMENTS |
|---|---|---|---|
| PROGRAM HARD KEYS | | | |
| 1) Put Genius in learn mode using learn switch recessed on side. | :LEARN: :MODE: | Alternate flashing for five cycles. 50 flashes/min (both words) | SOURCE: L  FUNCTION: LEARN |
| | :L: | L will flash continuously 100 flashes/min | SOURCE: L  FUNCTION: |
| 2) "Select Source","Press Enter" will appear after "Learn Mode" stops flashing. Source button on Genius will sequence thru (TV, VCR, Cable, and Aux.). Press Enter key on Genius to enter mode selected. | :1 SELECT: :SOURCE: :2 PRESS: :ENTER: :L: | Alternate flashing until Source is selected and entered 20 flashes/min (4 words) | SOURCE: L TV  FUNCTION: 1 SELECT  Any key other than Source or Enter will have no effect, except for Function which will cause "Error" to flash (5 times) on LCD. |
| 3) After Source is entered, the LCD will flash "Press Matching Keys". Align Genius and Original Transmitter as shown in the instruction book. Press key on O.T. to be learned and key on Genius to be copied at the same time and hold for approx. 2 sec. | :PRESS MATCHING KEYS: :L: :GENIUS: | Alternate flashing until key on O.T. and key on Genius are pressed together 35 flashes/min | SOURCE: L TV  FUNCTION: **GE\*NIUS**  PRESS MATCHING KEYS  Pressing only one key will have no effect. Pressing Source will take you out of "Press Matching Keys" mode & return you to step 2). |
| 4) After pressing matching keys, the Genius will learn the code of the O.T. and will flash "Release". Hold Keys down until "Release" flashes, then release Keys. | :RELEASE: :L: | Continuous flashing 50 flashes/min | SOURCE: L TV  FUNCTION: RELEASE  If the GENIUS Learns the Code, and Keys are Released, the LCD will display "Do Again". If you release the Keys too soon (before Function Learned), "Do Again" will also flash. (see step 5) |
| 5) After receiving first Code, the Genius will display "Do Again". This step is necessary to Verify that the First Code was received correctly. Press Matching Keys again. | :DO AGAIN: :L: :PRESS MATCHING KEYS: | Continuous flashing 50 flashes/min | SOURCE: L TV  FUNCTION: DO AGAIN  PRESS MATCHING KEYS  If the GENIUS verifies the Second Code is the same as the First, then the LCD will display "Function Learned". (see step 6) |
| 6) After Code has been verified, the LCD will display "Function Learned". Release keys. | :FUNCTION: :LEARNED: :L: | Alternate flashing 35 flashes/min (both words) | SOURCE: L TV  FUNCTION: FUNCTION |

| | | |
|---|---|---|
| 7) Genius is now ready to Learn another function. Repeat procedure above. | !PRESS MATCHING KEYS! !L! | |

PROGRAM LCD FUNCTIONS

| | | |
|---|---|---|
| 8) If there is no matching key on the Genius to the one you wish to copy, then you must use the LCD. Press the Function button and select the Function to be copied. The LCD will display several commonly used functions that can be copied and some A,B, etc. positions where you can program in your own function words. | !A! CONTRAST !PRESS MATCHING KEYS! !L! | Function words will appear in the LCD, and "Press Matching Keys" will continue to flash beneath the function word !A! 100 flashes/min |
| 9) To learn Contrast Up, select the Contrast !A! function on the LCD and then press both the O.T. function and the Up button associated with the LCD at the same time and repeat step 3-7. | !FUNCTION! !LEARNED! !L! | |
| 10) Continue to select and Learn each function in the LCD that you desire. | | |

PROGRAM WORDS INTO LCD

| | | |
|---|---|---|
| 11) If the correct word for the function that you want to copy is not available, you can then go to the A,B,etc. functions. In this position, you can add a word to the LCD. | | |
| 12) Be sure Genius is in the Learn mode. | !L! | |
| 13) Select the correct Source. (TV,VCR,Cable. or Aux.). Enter | !PRESS MATCHING KEYS! !L! | |
| 14) Press Function button until A appears in the LCD. AS you continue to sequence, the A will remain, but the flashing indicator will change !A! to !▼! to !●!, and then B will appear. | A !A! | |

Release keys (see step 7)

```
:SOURCE: L TV                       :
:FUNCTION:                          :
:                                   :
:   GE*NIUS                         :
:                                   :
:_____PRESS MATCHING KEYS_:
```

```
:SOURCE: L TV                       :
:FUNCTION:                          :
:                                  ▲:
:   CONTRAST                        :
:                                   :
:_____PRESS MATCHING KEYS_:
```

Pressing the Source key will return you to step 2).
See step 11) to explain A,B,C functions.

```
:SOURCE: L TV                       :
:FUNCTION:                          :
:                                   :
:   FUNCTION                        :
:                                   :
:_____:
```

The learned function is now programmed into the "USE" mode. When you switch to the Use mode, Contrast Up will be programmed into the LCD when you sequence thru the functions. Only learned functions will appear in the Use mode.

Be sure to learn the functions properly; that is, for Contrast Up use the Up button, for Contrast Down use the Down button, and for the On/Off or Momentary Contact button use the !●! button.

```
:SOURCE: L                          :
:FUNCTION:                          :
:                                   :
:                                   :
:                                   :
:_____:
```

```
:SOURCE: L TV                       :
:FUNCTION:                          :
:                                   :
:                                   :
:_____PRESS MATCHING KEYS_:
```

```
:SOURCE: L TV                       :
:FUNCTION:         A                :
:                                  ▲:
:                                   :
:_____PRESS MATCHING KEYS_:
```

When you add a word, in the ● (on/off) position, it will only be in that position. If you add a word in the ▲ (UP) position, then it will also be in the ▼ (DOWN) position.

15) When the A position has been selected, press the Plus button on the Genius and letters will appear flashing in the LCD in the first position. As you continue to press the Plus button, it will sequence thru the alphabet. If you press the Minus button, the letters will reverse. Holding the button down will cause the sequence to continue at fast speed. Pressing the button once and releasing quickly will advance the letters one step.

```
A        !T! flashing
         !A! 100 flashes/min
!T!          100 flashes/min
```

16) When you have sequenced to the Letter desired, press Enter. This will enter the letter into RAM memory and advance to the second position with a flashing line. The letter entered will stop flashing. Repeat the above and spell out the complete word. When word is complete and last letter entered, you may sequence out of this position with the Function button.

```
A
         !A!
TONE
```

17) To Learn this Function, be sure to select the correct indicator !A!, and follow the same procedure as described in statements 3-7.

CANCEL LEARNED FUNCTIONS IN LCD
-------------------------------

18) Be sure Genius is in the Learn mode.

!L!

19) Select correct Function (TV, VCR, Cable, or Aux.) Enter

!PRESS MATCHING KEYS!

20) Select Function to be deleted.

!A! CONTRAST

21) Press Clear and ▲ at the same time.

22) If you have a new word programmed in (Tone), pressing Clear & Enter will erase word and clear Learned code.

You are now in the Learn mode. Be careful not to press keys on O.T. unless you intend to Learn that function.

```
----------------------------------------
!SOURCE: L TV                          !
!FUNCTION:        A              ▲     !
! |T|                                  !
!_____PRESS MATCHING KEYS___!
```

```
----------------------------------------
!SOURCE: L TV                          !
!FUNCTION:        A              ▲     !
! |TONE__|                             !
!_____PRESS MATCHING KEYS___!
```

Each letter entered will be in permanent memory. Each time that you sequence thru this position, in the Learn mode, these letters will appear.

After learning "Tone Up", the LCD Display will return to "Tone Up" as shown in step 14).

Function "Contrast Up" will be cleared from the Use mode. If the word is a pre-programmed word, it will remain in the Learn mode.

Tone will be cleared from the Use mode, and also from the Learn mode. The !A! Up will remain.

RGE
4/16/84

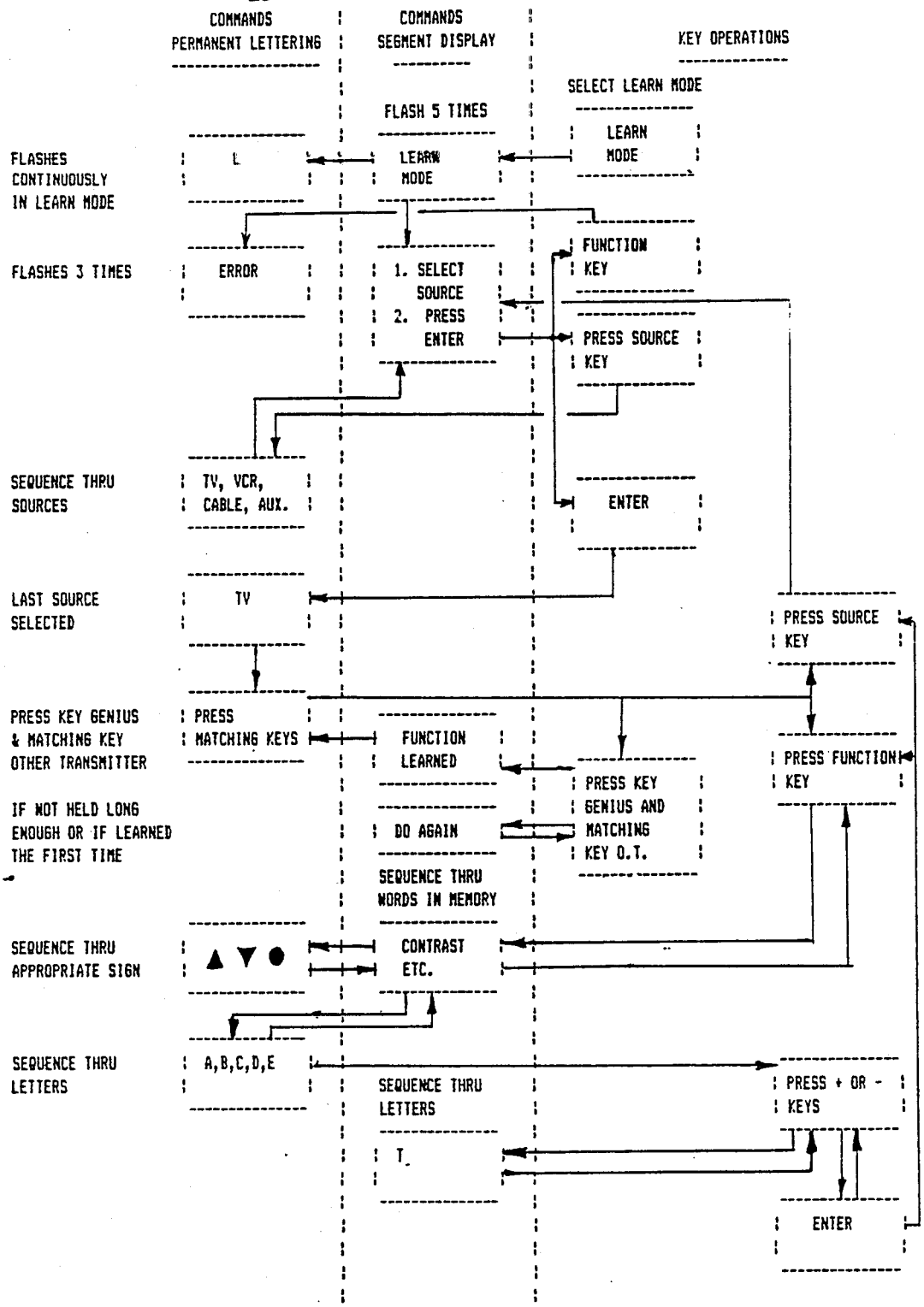

| State | L / GENIUS display | +/- | CLEAR | ENTER/RECALL | OTHER BUTTONS |
|---|---|---|---|---|---|
| 2) | "1.SELECT SOURCE" "2.PRESS ENTER" will start flashing after "LEARN MODE" stops. The LCD will display TV source initially. "L" flashes continuously. | Will return to USE mode. | NOP | Pressing this key will step you thru the SOURCES (TV,VCR, CABLE,AUX and back again). | Flash "ERROR" three times and return to state 2). |
| 3) | "PRESS MATCHING KEYS" will begin flashing after Enter button is pressed. GENIUS is now ready to Learn a new code. "L" flashes continuously. "GE*NIUS" will light up in the alphanumeric display. | Will return to USE mode. | Pushing Reset switch will erase any functions learned and clear memory in RAM for the Source selected. If the Source selected has G.E. codes stored in ROM, it will default to those codes. After pressing you will remain in state 3). | Pressing this key will return you to "1.SELECT SOURCE" "2.PRESS ENTER". See state 2). | Initially the LCD will display GE*NIUS. After the first pressing, the first pre-programmed commonly used function for the Sourced selected will appear. (See state 6) |
| 4) | "RELEASE" Flashes continuously when a signal is received from the O.T. in state 3) and the matching Genius key is pressed. "Press Matching Keys" not lighted. "L" flashes continuously. | Will return to USE mode. | Pushing Reset switch will erase any functions learned and clear memory in RAM for the Source selected. If the Source selected has G.E. codes stored in ROM, it will default to those codes. After pressing you will return to state 3). | NOP | NOP |

| State | ▲●▼ | +/- | CLEAR | ENTER/RECALL | OTHER BUTTONS |
|---|---|---|---|---|---|
| 1). | NOP | NOP | NOP | NOP | NOP |
| 2) | NOP | NOP | NOP | Enters TV mode if no additional sources have been selected. Enters last source selected if it has been changed. "PRESS MATCHING KEYS" will flash (state 3). | NOP |
| 3) | NOP | Can Learn +/- function in this mode. Pressing by itself - NOP. | Can Learn Clear function in this mode. See state 9) to use with other keys to Clear LCD functions from the USE mode. Pressing by itself - NOP. | Can Learn Enter/ Recall function in this mode. Pressing by itself - NOP. | All of these buttons can be used with the buttons of the O.T. to Learn a Function. Pressing these keys by themselves - NOP. Press any of these keys plus the keys of the O.T. will indicate "Release" (see state 4). If the Genius key is released before the Function is Learned, "DO AGAIN" will flash in alpha. display (see state 5). The Keys on the Genius in TV, |

| | | | | |
|---|---|---|---|---|
| | | | | and VCR modes have been pre-programmed to the G.E. codes, but can be changed by Learning new codes over them. |
| 4) NOP | NOP | NOP | NOP | Release Genius Key will cause "Release" to stop flashing and "Do Again" to flash (see state 5). |
| 5) "DO AGAIN" GENIUS is now ready to to verify that code has been Learned. "Press Matching Keys" is flashing. "L" flashes continuously. | Will return to USE mode. | Pushing Reset switch will erase any functions learned and clear memory in RAM for the Source selected. If the Source selected has G.E. codes stored in ROM, it will default to those codes. After pressing you will return to state 3). | Pressing this key will return you to "1.SELECT SOURCE" "2.PRESS ENTER". See state 2). | NOP |
| 6) "FUNCTION" "LEARNED" will flash 3 times after code has been successfully transmitted from the O.T. to the GENIUS. After flashing, it will return you to the state you were previously in. If you were in any of the two LCD states, it will return you to the Function that you just Learned. "L" flashes continuously. | Will return to USE mode. Any Function Learned in the Learn mode will now be in the Use mode. Only those LCD Functions learned will appear in the USE mode. | NOP | NOP | NOP |
| 7) LCD STATE 1 "PRESS MATCHING KEYS" "SLOW" lighted in alpha. display. "↕" flashes continuously. "L" flashes continuously. The Function button has been pressed, and in this case we are in the VCR Source mode and Slow is the first function on the Pre-programmed list. Slow has both an on/off and up/dn functions. | Will return to USE mode. | Pushing Reset switch will erase any functions learned and clear memory in RAM for the Source selected. If the Source selected has G.E. codes stored in ROM, it will default to those codes. After pressing you will return to state 3). | Pressing this key will return you to "1.SELECT SOURCE" "2.PRESS ENTER". See state 2). | With additional pressings it will sequence through the preprogrammed functions and into state 8). |
| 5) NOP | NOP | NOP | NOP | Press the same Keys again and the LCD will say "Function" "Learned" (See state 6). If you release GENIUS key too soon, or a different signal is received the second time, the LCD will |

| | | | | display "DO AGAIN". Repeat state 5) until LCD says "FUNCTION" "LEARNED" (then see state 6). |
|---|---|---|---|---|
| 6) NOP | NOP | NOP | NOP | NOP |
| 7) These Keys can be used with the keys of the O.T. to Learn new Codes for each LCD function. Pressing by itself – NOP. | Can Learn +/- function in this mode. Pressing by itself – NOP. | Can Learn Clear function in this mode. See state 9) to use with other keys to Clear LCD functions from the USE mode. Pressing by itself – NOP. | Can Learn Enter/Recall function in this mode. Pressing by itself – NOP. | All of these buttons can be used with the buttons of the O.T. to Learn a Function. Pressing these keys by themselves – NOP. Press any of these keys plus the keys of the O.T. will indicate "Release" (see state 4). If the Genius key is released before the Function is Learned, "DO AGAIN" will flash in alpha. display (see state 5). The Keys on the Genius in TV, and VCR modes have been pre-programmed to the G.E. codes, but can be changed by Learning new codes over them. |
| 8) LCD STATE 2 A,B,C,D, or E Functions. "A" lighted initially. "L" flashes continuously. When you want to add a word which has not been permanently listed in the LCD library of commonly used Functions, sequence the function button to the A,B, etc. position desired. Press +/- keys to start spelling out a word. | Will return to USE mode. | Pushing Reset switch will erase any functions learned and clear memory in RAM for the Source selected. If the Source selected has G.E. codes stored in ROM, it will default to those codes. After pressing you will return to state 3). | Pressing this key will return you to "1.SELECT SOURCE" "2.PRESS ENTER". See state 2). | Pressing this button will sequence you thru the A,B,C,D,&E positions where you can add a word and then back to state 7). |
| 9) Clear – Cancel a Word, or Programmed LCD Function in USE mode. Start at state 6 or 7 in the Learn mode. | Will return to USE mode. | Pushing Reset switch will erase any functions learned and clear memory in RAM for the Source selected. If the Source selected has G.E. codes stored in ROM, it will default to those codes. After pressing you will return to state 3). | Pressing this key will return you to "1.SELECT SOURCE" "2.PRESS ENTER". See state 2). | LCD will step you thru preprogrammed commonly used functions or A,B,etc functions depending on which state you are in. Use this key to select Function to be cleared. |

I claim:

1. In a reconfigurable remote control transmitter for use with a plurality of remotely controlled products or appliances each of which is controllable with one or more signals transmitted from an associated remote control transmitter, said reconfigurable remote control transmitter emulating the remote control transmitters of said plurality of remotely controlled products or appliances and comprising receiver means operable in a learning mode for receiving signals transmitted from a remote control transmitter to be emulated, said signals being comprised of bursts of pulses separated by pauses, prompting means, microprocessor means connected to receive the output of said receiver means during said learning mode and coupled to said prompting means for prompting a user to initiate transmission of a signal from the remote control transmitter to be emulated and counting the number of pulses in each burst of pulses and the time duration of each pause of a transmission, said microprocessor means being programmed to categorize the pulse bursts and pauses and generate a compressed code for each signal provided by the remote control transmitter to be emulated, memory means addressed by said microprocessor means for storing said compressed codes, and transmitter means controlled by said microprocessor means in an emulation mode for transmitting a coded signal for controlling a selected remotely controlled product or appliance, said microprocessor means being further programmed to recall from said memory means a desired compressed code, expand said code and cause said transmitter means to transmit the coded signal in an emulation mode, the improvement comprising:

said prompting means includes display means controlled by said microprocessor means for identifying a selected source corresponding to one of said remotely controlled products or appliances; and source means connected to said microprocessor means which when actuated causes said display means to successively identify a plurality of sources.

2. The improvement in the reconfigurable remote control transmitter as recited in claim 1 wherein said display means further displays a selected function of a selected one of said plurality of sources, further comprising means connected to said microprocessor means which when actuated causes a sequential display of functions which may be selected for the selected source.

3. The improvement in the reconfigurable remote control transmitter as recited in claim 2 wherein at least one of the functions displayed by said display means includes a user definable function, further comprising alphabetic character key means connected to said microprocessor means which when depressed causes alphabetic characters to be successively displayed, and enter key means also connected to said microprocessor means which when depressed enters the current alphabetic character displayed and indexes the display one character position to allow for the successive entry of alphabetic characters in order to name the user defined function.

4. The improvement in the reconfigurable remote control transmitter as recited in claim 2 wherein said display means is a liquid crystal display having icons and legends energized by said microprocessor means according to the source and function selected.

5. The improvement in the reconfigurable remote control transmitter as recited in claim 4 wherein said microprocessor means is programmed to display only those functions learned in said learning mode when said reconfigurable remote control transmitter is used in said emulation mode.

6. The improvement in the reconfigurable remote control transmitter as recited in claim 4 wherein said microprocessor means is programmed to energize said liquid crystal display in said learning mode to provide instructions to the user.

* * * * *